US007127529B2

(12) United States Patent
Montgomery et al.

(10) Patent No.: US 7,127,529 B2
(45) Date of Patent: Oct. 24, 2006

(54) SMART CARD SYSTEM HAVING ASYNCHRONOUS COMMUNICATION WITH THE SMART CARD OPERATING EITHER AS MASTER OR SLAVE

(75) Inventors: Michael A. Montgomery, Austin, TX (US); Scott B. Guthery, Redmond, WA (US); Bertrand du Castel, Austin, TX (US)

(73) Assignee: AxAlto, Inc., Austin, TX (US)

( * ) Notice: Subject to any disclaimer, the term of this patent is extended or adjusted under 35 U.S.C. 154(b) by 501 days.

(21) Appl. No.: 09/727,174

(22) Filed: Nov. 30, 2000

(65) Prior Publication Data

US 2001/0000814 A1 May 3, 2001

Related U.S. Application Data

(63) Continuation of application No. 09/107,033, filed on Jun. 29, 1998, now Pat. No. 6,157,966.

(60) Provisional application No. 60/051,326, filed on Jun. 30, 1997.

(51) Int. Cl.
*G06F 3/00* (2006.01)

(52) U.S. Cl. .............................. 710/1; 710/15; 710/30; 710/33; 370/345; 705/41

(58) Field of Classification Search ................ 710/15, 710/33, 30; 370/345; 705/41
See application file for complete search history.

(56) References Cited

U.S. PATENT DOCUMENTS

| 4,631,666 | A | * | 12/1986 | Harris et al. ................ 709/217 |
| 4,796,025 | A | * | 1/1989 | Farley et al. ............... 340/3.51 |
| 4,816,653 | A | * | 3/1989 | Anderl et al. ............... 235/380 |
| 4,939,353 | A | * | 7/1990 | Iijima ......................... 235/438 |
| 5,101,410 | A | * | 3/1992 | Niimura et al. ................ 714/45 |
| 5,369,760 | A | * | 11/1994 | Iijima ........................... 714/48 |
| 5,682,027 | A | * | 10/1997 | Bertina et al. ............... 235/380 |
| 5,761,309 | A | * | 6/1998 | Ohashi et al. ............... 713/156 |
| 5,790,885 | A | * | 8/1998 | Shona ........................... 710/5 |
| 5,796,832 | A | * | 8/1998 | Kawan ......................... 705/65 |
| 5,889,963 | A | * | 3/1999 | Gopal et al. ................. 709/228 |
| 5,987,018 | A | * | 11/1999 | Freeburg et al. .......... 370/310.2 |
| 6,012,634 | A | * | 1/2000 | Brogan et al. ............... 235/380 |
| 6,297,724 | B1 | * | 10/2001 | Bryans et al. ............. 340/3.51 |
| 6,463,095 | B1 | * | 10/2002 | Kataoka et al. ............. 375/223 |
| 6,662,286 | B1 | * | 12/2003 | Kusakabe et al. .......... 711/170 |
| 2004/0041029 | A1 | * | 3/2004 | Postman et al. ......... 235/462.3 |

FOREIGN PATENT DOCUMENTS

JP          01280889 A  *  11/1989

OTHER PUBLICATIONS

Harry Newton, Newton's Telecom Dictionary, Feb. 2002, CMP Books, 18th Edition, p. 577.*
Microsoft Corporation, Microsoft Computer Dictionary, 2002, Microsoft Press, 5th Edition, p. 38.*

* cited by examiner

*Primary Examiner*—Fritz Fleming
*Assistant Examiner*—Niketa I. Patel
(74) *Attorney, Agent, or Firm*—Anderson & Jansson, LLP

(57) ABSTRACT

A smart card comprises a microcontroller, a memory unit, a storage unit, and a communications unit. The smart card may be connected to a terminal, which is in turn may be connected to a host computer and/or a network. The smart card is configured to initiate communications with the terminal, which enables the smart card to control the terminal, host computer, or network and to access the resources connected to the terminal, host computer, or network. A communications protocol defines the commands that the smart card can send and allows the smart card to communicate using asynchronous or logical asynchronous communication.

18 Claims, 8 Drawing Sheets

SMART CARD SYSTEM HAVING ASYNCHRONOUS COMMUNICATION WITH THE SMART CARD OPERATING EITHER AS MASTER OR SLAVE

This application is a continuation of U.S. patent application Ser. No. 09/107,033 filed Jun. 29, 1998, now U.S. Pat. No. 6,157,966 granted on Dec. 5, 2000. This application claims the benefit of the filing of U.S. Provisional Patent Application No. 60/051,326, filed Jun. 30, 1997.

BACKGROUND OF THE INVENTION

The invention relates to smart cards, and in particular to smart card control of terminal and network resources.

Smart cards are used for a variety of applications including electronic game cards, identification badges, and data storage media such as electronic books. The smart cards are typically encased in a tamper-resistant, plastic or metal housing about the size of a credit card and contain one or more embedded integrated circuit devices. Terminals, such as ID verification systems and electronic video games, etc., are available with one or more smart card interfaces that permit connection of the smart card to the terminal.

In traditional systems, the terminals or terminal device accesses the smart card through standard protocols, such as the ISO 7816 protocol. These protocols usually limit the smart cards to the role of "slave", while the terminal or terminal device acts as the "master". This means that the smart card cannot initiate any action or communication, but can only respond to specific commands from the terminal. A prior art terminal typically starts in the idle state (ST11), as shown in FIG. 1. The terminal then transmits a command to the smart card (ST12), and then waits for a response (ST13). After receiving the response from the smart card (ST14), the terminal returns to the idle state (ST11). Similarly, as shown in FIG. 2, a prior art smart card begins with the smart card waiting for a command from the terminal (ST21). Upon receiving the command from the terminal (ST22), the smart card proceeds to prepare an appropriate response (ST23), transmits the response to the terminal (ST24), and returns to the wait state (ST21) to await the next command. Under the above scheme, there is no provision for the smart card to access resources controlled by the terminal.

SUMMARY OF THE INVENTION

In general, in one aspect, the invention relates to a smart card system. The system has a terminal and a smart card that is connected to the terminal and configured to initiate communication with the terminal. The smart card communicates with the terminal using a communications protocol that enables asynchronous communications between the smart card and the terminal. For systems that do not support asynchronous communication, the communications protocol also enables logical asynchronous communications. The system further comprises means for establishing full-duplex or logical full-duplex communication between the smart card and the terminal. The terminal may be connected to a host computer which is in turn connected to a network. The smart card can access the resources connected to the terminal, the host computer, and the network.

In general, in another aspect, the invention relates to a smart card that has a communications circuit and a microcontroller. The microcontroller is configured to initiate communication with a terminal to which the smart card is connected. The smart card also has a storage unit that stores programs that are executed by the microcontroller and a memory unit that temporarily stores the programs. The terminal may be connected to a host computer and a network, and the smart card may access the resources connected to the terminal, the host computer, and the network.

In general, in another aspect, the invention relates to a method of operating a smart card. The method comprises transmitting a command from the smart card to the terminal, waiting for a response from the terminal, and receiving the response from the terminal. The smart card initiates communication with the terminal. A communications protocol, which may be configured to be ISO 7816 compatible, allows the smart card to communicate asynchronously with the terminal, or logically asynchronously with the terminal in cases where the actual asynchronous communication is not available. Additionally, the communication may occur in full-duplex mode. If a response is not received within a predefined time period, the smart card re-transmits the command. The method also comprises requesting a list of available services from the terminal and selecting a command based on the list of services.

In general, in another aspect, the invention relates to a method of debugging a smart card. The method includes executing a diagnostic portion of a program stored on the smart card, receiving a result from the smart card, and comparing the result with an expected result. The method further includes displaying the result on a terminal display.

Advantages of the invention include at least the following: smart card control of terminal, host computer, and network resources; smart card-initiated communication with a terminal, host computer, and network; and asynchronous communication between a smart card and a terminal, host computer, and network. Other advantages will become apparent from the below description and the following claims.

DETAILED DESCRIPTION OF THE PREFERRED EMBODIMENT

Throughout the description and the drawings, elements which are the same will be accorded the same reference numbers.

Figure 1:
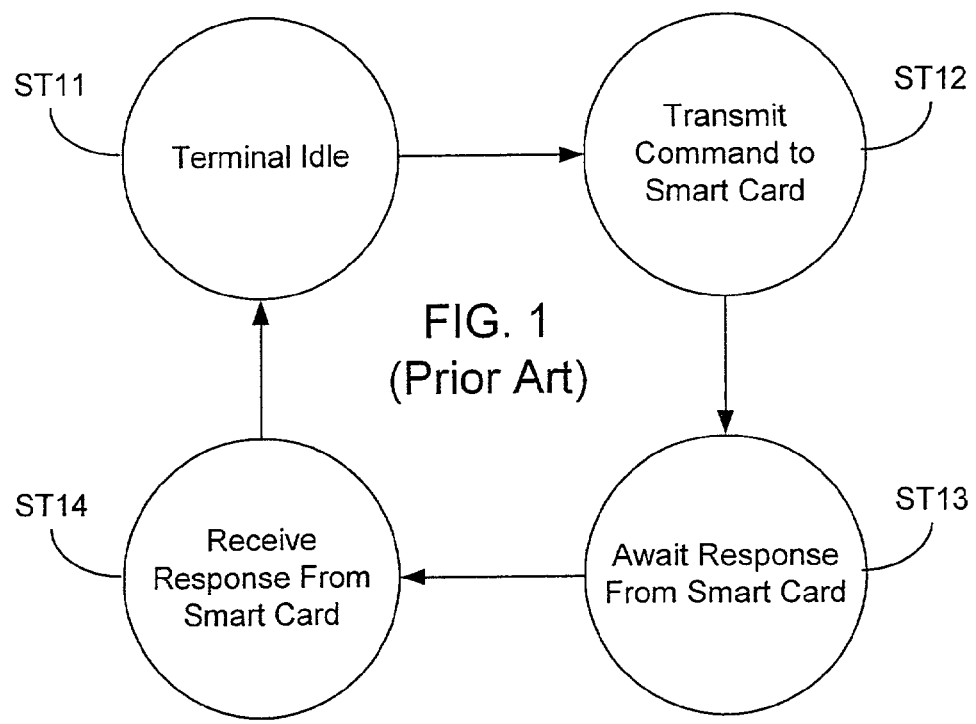
FIG. 1 is a state machine diagram of a prior art terminal.
Figure 2:
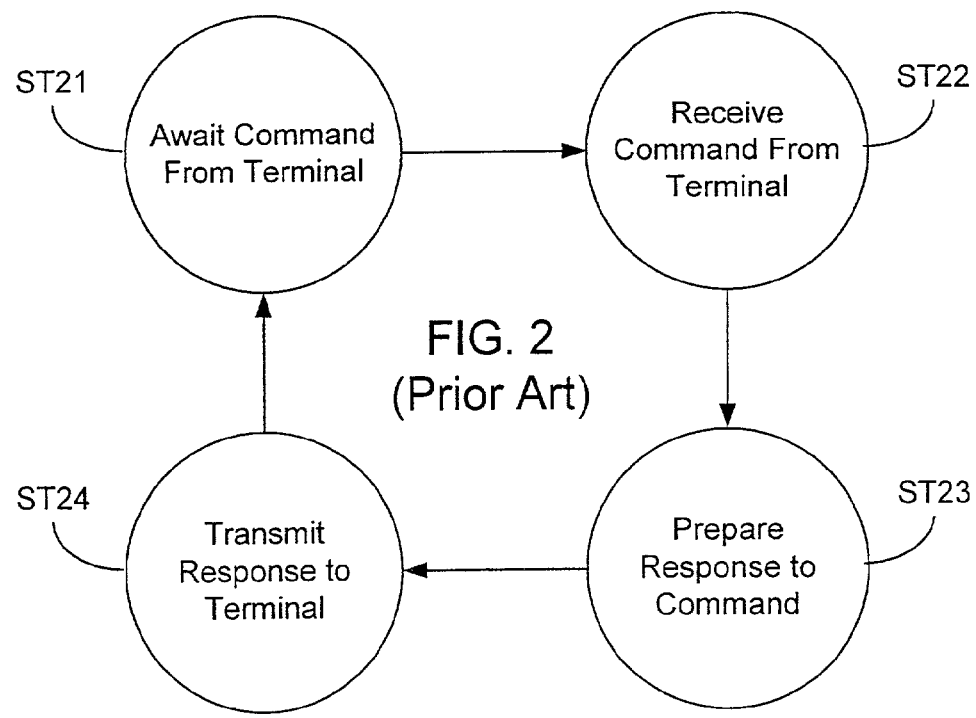
FIG. 2 is a state machine diagram of a prior art smart card.
Figure 3:
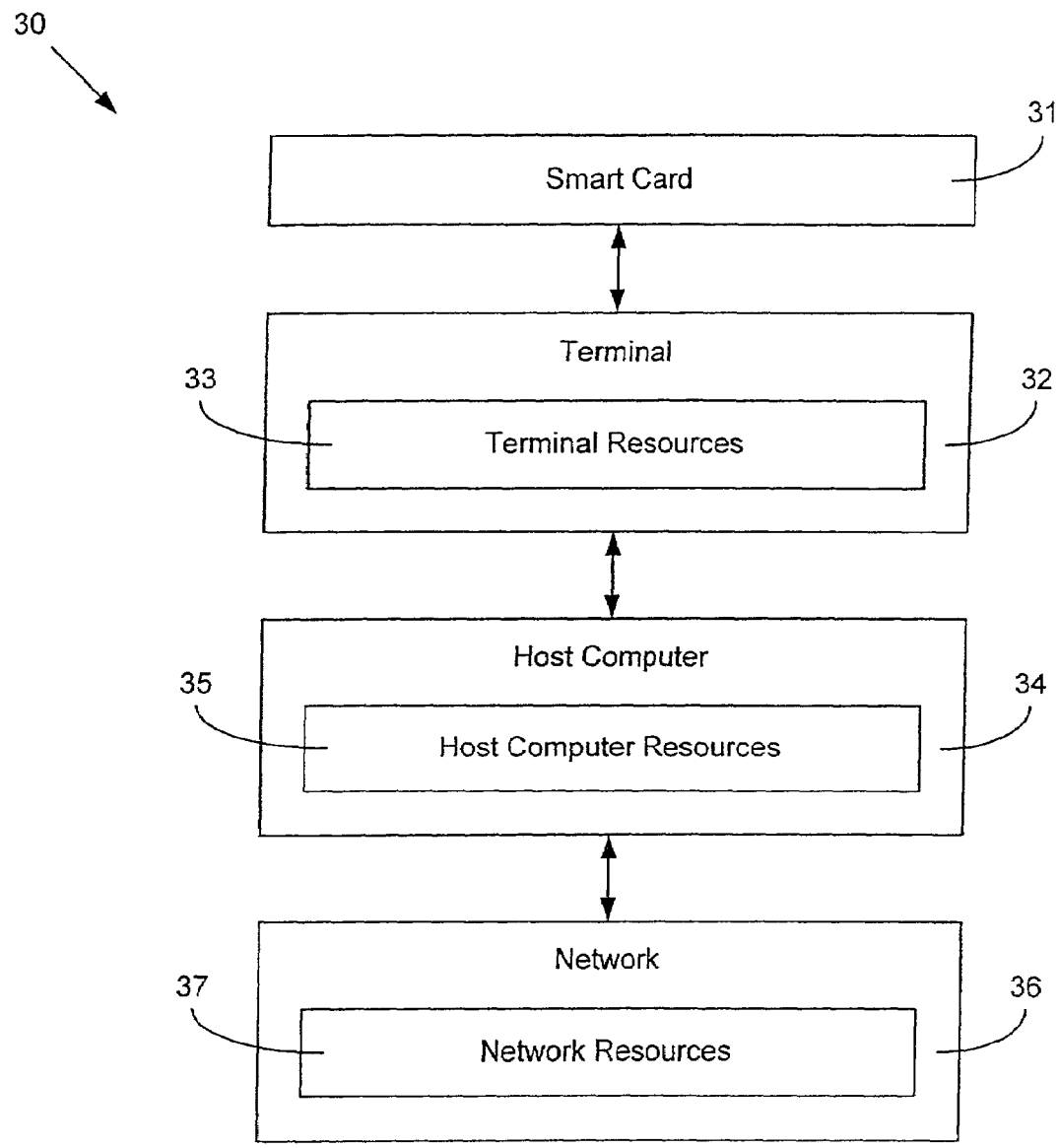
FIG. 3 is a block diagram of a smart card system.

Referring to FIG. 3, a smart card systems 30 has a smart card 31 connected to a terminal 32 which has terminal resources 33 available. The terminal resources 33 may be very minimal, such as an input/output port for connecting to a host computer, or the resources 33 could be more extensive, for example, a keyboard, monitor, modem, cash dispenser, and other specialized resources.

In some systems, the smart card 31 and the terminal 32 operate independently of any other devices. This is exemplified by portable value checker products which allow a particular value in the smart card 31 to be displayed by the terminal, and portable Mondex transaction devices which allow two smart cards 31 to be connected to a single terminal 32, and to transfer data between the two cards 31.

In other systems, the terminal resources 33 connect the terminal 32 to a host computer 34, which has certain host computer resources 35 available. These resources could include a network connection, keyboard, monitor, hard disk, and other types of resources common to computers or specialized for a particular application. The smart card 31 can send commands to, and receive responses from, the host computer 34 through the terminal 32, and vice-versa.

The host computer 34 optionally can be connected to a network 36 if the host computer resources 35 include a network port. This allows the host computer 34 to gain access to network resources 37, which include other computers, printers, storage devices, and other potential resources, including for example resources available on the Internet. In such systems, the smart card 31 can be used as a tamper-resistant storage unit for network passwords, keys, certificates, electronic cash, and other information which the host computer 34 uses for network access, electronic commerce, and other types of network applications.

Figure 4:
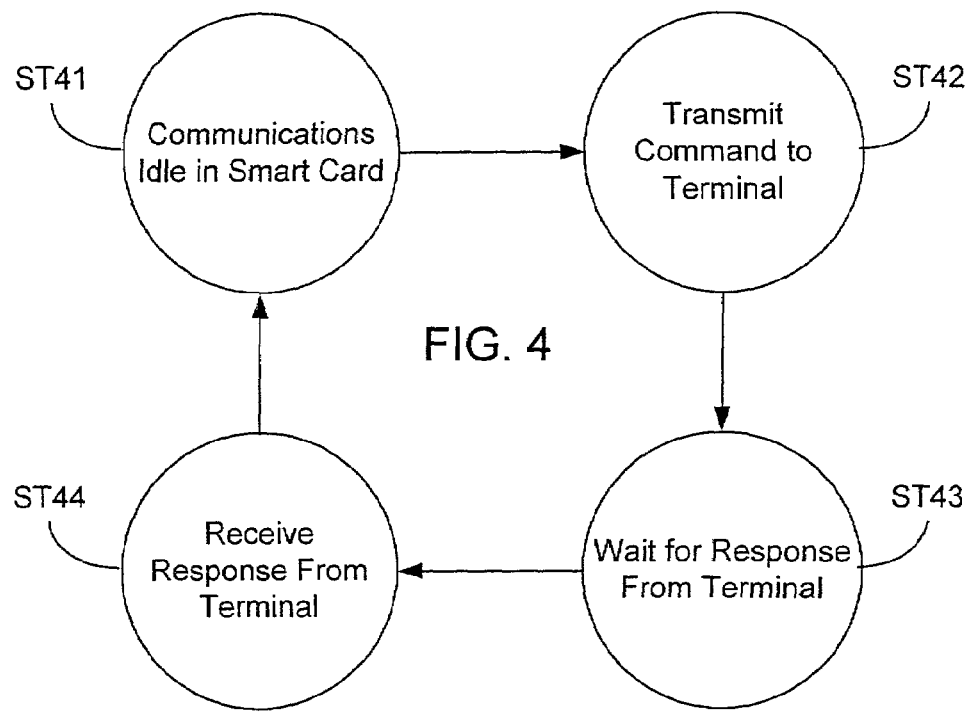
FIG. 4 is a state machine diagram of the smart card of the present invention.
Figure 5:
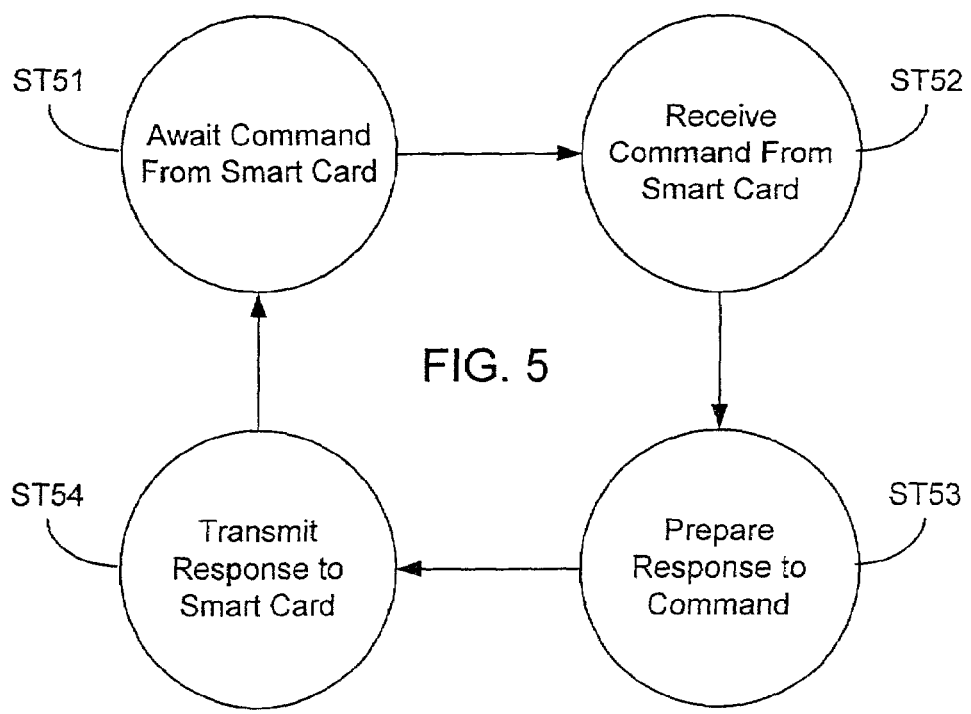
FIG. 5 is a state machine diagram of the terminal of the present invention.

An advantage of the smart card 31 is that it is able to initiate communication with the terminal 32 and thereby become a "master" while the terminal 32 acts as a "slave", as illustrated in FIG. 4 and FIG. 5. Referring to FIG. 4, communications is in an idle state in the smart card 31 while the smart card 31 is processing data or waiting for some event to occur (ST41). When the smart card 31 needs to communicate with the terminal 32, it transmits a command (e.g., a display data command), or a message, or a packet of information to the terminal (ST42). After the transmission, the smart card 31 waits (ST43) until it receives a response (ST44) from the terminal 32 (e.g., an acknowledgement of the command). Once the response has been received, the smart card 31 returns to the idle state (ST41) until the card needs to communicate with the terminal 32 again. Under such a scheme, the smart card 31 may initiate communication with the terminal at any time. For example, if data or information from the terminal 32 which is needed by the smart card 31 to carry out a certain task is missing or incomplete, rather than remain in an idle state awaiting further data transfer, the smart card 31 can act proactively and request the missing information from the terminal 32.

Referring to FIG. 5, terminal 32 waits in an idle state for a command from the smart card 31 (ST51). When a command is detected, the terminal 32 receives the command and prepares an appropriate response (ST52 and ST53). The terminal 32 then transmits the response to the smart card 31 (ST54) and returns to the idle state to await receipt of another command (ST51).

In a similar way, the smart card 31 may access host computer resources 35 and network resources 37 by issuing, for example, a print command to a printer resource or a send network message command to a network messaging resource.

In some cases, it may be desirable to add time-out features to the smart card 31 so that if a response is not received in the allotted time, the smart card 31 takes alternative actions, such as re-transmitting the command or transmitting a different command.

Figure 6:
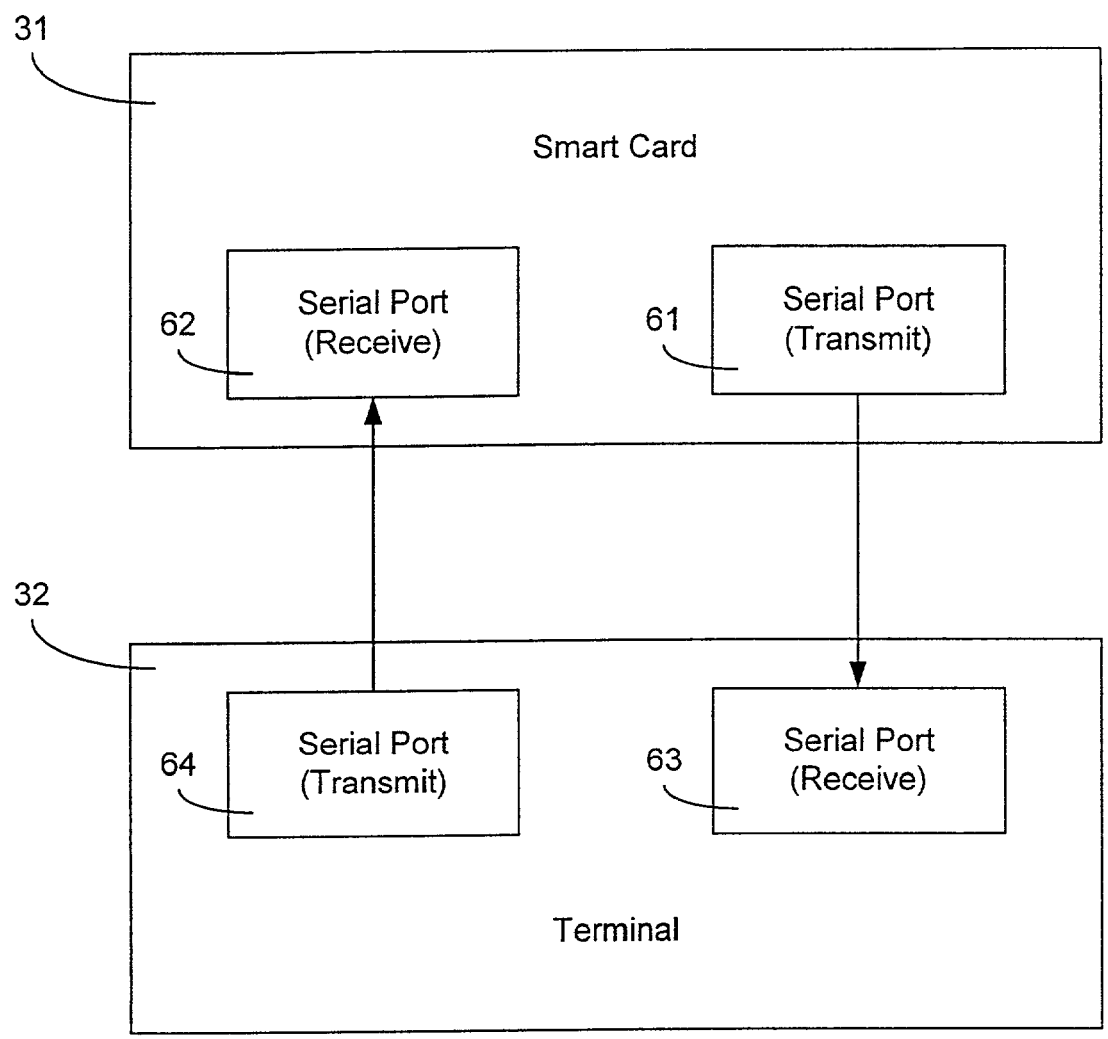
FIG. 6 is a block diagram of a smart card communications scheme.

It should be noted that the state machine diagrams of FIGS. 4 and 5 represent systems with only half-duplex communication between the smart card 31 and terminal 32. Alternative systems may, of course, be designed to support full-duplex communication between the smart card 31 and terminal 32. For example, referring to FIG. 6, full-duplex communication between the smart card 31 and the terminal 32 may be implemented using two conventional RS-232 serial ports in both the smart card 31 and terminal 32. Serial ports 61 and 62 of the smart card 31 transmit and receive data to and from serial ports 63 and 64 in the terminal 32, respectively. Because the transmissions in one direction are independent in time relative to the transmissions in the other direction, the smart card 31 and the terminal 32 may communicate with each other asynchronously.

In contrast, systems that have only half-duplex physical channels are generally limited to synchronous communication and typically require synchronous communication protocols, e.g., the ISO 7816 protocol. However, such a system may implement a special low level protocol which appears as an asynchronous protocol interface to the higher level protocols. This will allow the devices in the system to communicate with each other and with external devices using high level protocols which require asynchronous communications. For example, a "polling protocol" may be used with a smart card 31 and a terminal 32 that support the ISO 7816 half-duplex low level protocols. In the polling protocol, the terminal 32 has an obligation to send packets to the smart card 31 at the earliest possible opportunity. In the case where there is no terminal data to be sent, a special class of instruction code may be sent to indicate to the smart card 31 that this is only a polling packet. If the smart card 31 is ready to send data to the terminal 32, it sends a response to the terminal 32 containing a byte which indicates the length of the data the smart card 32 is ready to send. The terminal 32 then responds with a special packet having a length which is equal to the length indicated by the smart card 31. This then allows the smart card 31 to send its data to the terminal 32, effectively allowing the smart card 31 to initiate communication with the terminal 32. The polling may be repeated at the maximum rate that is supported by the terminal 32. Such a low level protocol may be augmented by marking each message in each direction with a unique identifier, for example, a sequence number. This allows the responses in either direction to be deferred and sent later using the sequence number to correlate with the original messages. For example, if the terminal sent a message requiring a response, at the low level protocol the smart card could continue communicating other messages back and forth. Then, when the desired response is ready, the smart card 31 marks the response with the identification number of the initiating message. When the terminal 32 receives the response, it correlates the response with the original message and returns the response value to the thread that initiated the message. Such a scheme also may permit the original thread to continue execution without waiting for the response, and allows the response to be passed back to the thread (or to another designated thread) using a callback mechanism. It will be appreciated that this logically presents what appears to be a full asynchronous interface to the higher level protocols.

Asynchronous communication between the smart card 31 and the terminal 32 allows more complex systems to be designed. For example, conventional packet protocols exist which would allow packets to be initiated by both the smart card 31 and terminal 32, which may result in multiple packets that are in various states of processing occurring at the same time. This permits the use of high level features such as multi-threaded communications and callbacks. In short, FIG. 4 and FIG. 5 are illustrative of the simplest state machines that implement smart card initiated communications, which is the key to this invention. It is well understood that other state machines for both half-duplex and full-duplex communications can be devised, as well as non-state based protocols, and are intended to fall within the scope of this invention if such communication protocols include card initiated communication. Since low level protocols based on this invention could allow asynchronous communication between the smart card 11 and the terminal 12, this can further enable high level communication protocols, such Remote Procedure Call and Remote Message Invocation, to be used. Such protocols can greatly enhance the value of the smart cards for many applications. In short, FIG. 4 and FIG. 5 illustrate only the simplest systems that implement smart card-initiated communications. Other systems having both half-duplex and full-duplex communications may be devised that, so long as they include smart card-initiated communication, are within the scope of the invention.

Figure 7:
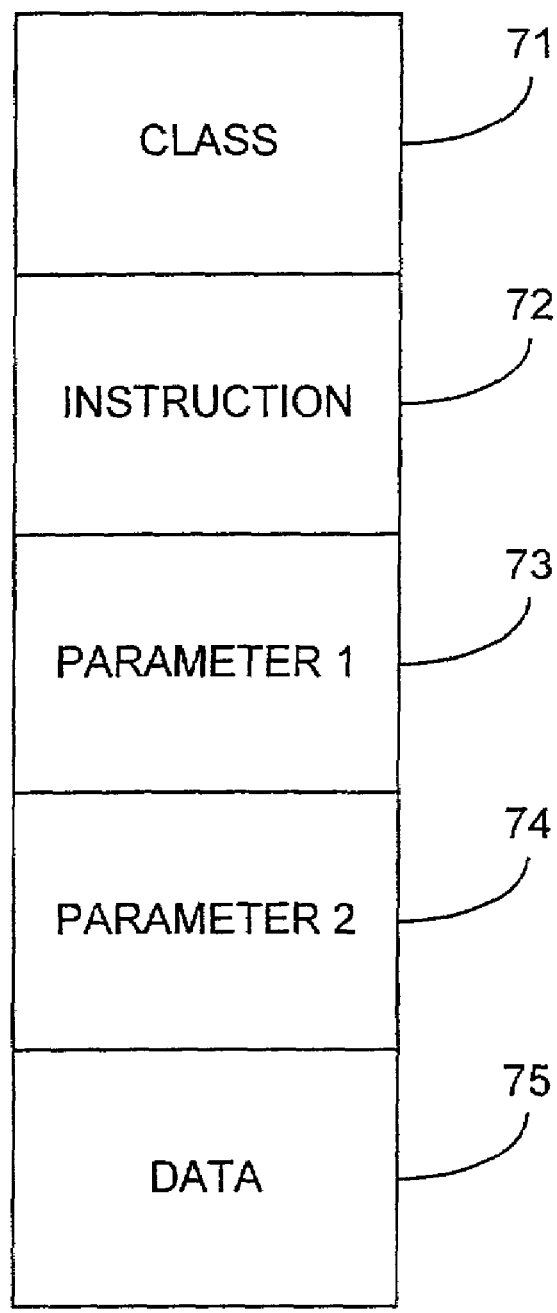
FIG. 7 illustrates a smart card communications protocol.

In another embodiment, a communications protocol, shown generally at 70 in FIG. 7 and in more detail in TABLE 1, defines the commands that the smart card can initiate with respect to the terminal, host computer, or network. The communications protocol 70 uses ISO 7816 escape commands with the existing ISO 7816 protocol to generate a new set of smart card-initiated commands. The use of the ISO 7816 escape commands allows the communications protocol 70 to retain backwards compatibility with standard ISO 7816 commands. Each command in the communications protocol 70 is comprised of the following ISO 7816 fields: a class (CLA) field 71, an instruction (INS) field 72, a first parameter (P1) field 73, a second parameter (P2) field 74, and a data (Data) field 75. Not every field is required for every command and some fields may be either left empty or filled with a null value. The fields themselves are standard ISO 7816 fields well known to one having ordinary skill in the art and will not be described here.

protocol 70 may use a global naming convention (e.g., the Domain Name Service (DNS)) such that the smart card may specify a particular resource on a global basis.

Referring to TABLE 1, the commands defined in the communications protocol 70 include the following: Display Request, Activate Input Scan, Request Data Length in Buffer, Request Data in Buffer, Activate Secure ID Entry, Query Resources, and Send Network Message. The Display Request command allows the smart card to display information on the terminal, host computer, or network display device. A Java program implementing this command using the standard Java Card 1.0 specification is shown in Appendix A. The Activate Input Scan command scans for user input. The Request Data Length in Buffer command, which may be executed at any time, determines the length of the data in the input buffer. The Request Data in Buffer command reads the data entered in the terminal, host computer, or network input buffer. The Request a Secure ID Entry command requests identification information such as a username, password, or biometrics information such as a thumbprint or voiceprint. The Query Resources command, as indicated above, queries the terminal, host computer, or network for available services and resources. This command may also be used to determine other information such as available user input devices, secure ID devices, network connectivity, data files, database availability, and other types of services were resources. The Send Network Message command sends a message to a network computer which is identified by the standard DNS node ID convention. This command is sent from the smart card to the host computer, which must either receive and execute this command or return an error response to the smart card. If the network computer identified is the host computer, then the command is executed locally. Otherwise, the host computer routes the command through the network to the identified network computer.

TABLE 1

Communications protocol: Mapping To ISO 7816 Escape Commands

| Command Type | CLA | INS | P1 | P2 | Data | Response |
|---|---|---|---|---|---|---|
| Display Request | D0 | E0 | Fm | Lc | Disp Data | 90 00 (OK) |
| | | | | | | 6F 00 (Error) |
| Activate Input Scan | D0 | E1 | 00 | 00 | None | 90 00 (OK) |
| | | | | | | 6F 00 (Error) |
| Request Data Length In Buffer | D0 | E2 | 00 | 00 | None | Length + 90 00 (OK) |
| | | | | | | 6F 00 (Error) |
| Request Data in Buffer | D0 | E3 | 00 | Ln | None | InputData + 90 00 (OK) |
| | | | | | | 6F 00 (Error) |
| Activate Secure ID Entry | D0 | E4 | 00 | 00 | None | Length + IDData + 90 00 (OK) |
| | | | | | | 6F 00 (Error) |
| Query terminal Resources | D0 | E5 | Rs | 00 | None | Length + ResData + 90 00 (OK) |
| | | | | | | 6F 00 (Error) |
| Send Network Message | D0 | E4 | Ld | Lm | ID + Msg | Length + Response + 90 00 (OK) |
| | | | | | | 6F 00 (Error) |

The commands of the communications protocol 70 may be defined broadly such that not every terminal, host computer, network, or the resources connected thereto will have the service requested. When a particular service is not available, the communications protocol 70 includes an error message which may be sent back to the smart card to indicate that the requested service is not available. In one embodiment, the communications protocol 70 includes a query command so that the smart card can query the terminal, host computer, or network to determine which services are available. In addition, the communications The communications protocol 70 may, of course, be expanded as required to support other services. Furthermore, for systems that use full-duplex communication between the smart card and the terminal and do not require ISO 7816 compatibility, standard asynchronous callback mechanisms can be added to the protocol to expand functionality and improve performance greatly. For example, instead of sending a network message and waiting for a response, the smart card can continue normal processing. Once the response has been prepared by the DNS node that received the message, an asynchronous response message can be sent to the smart card. Other half-duplex and full-duplex communications protocols can be devised readily and are intended to fall within the scope of this invention if such communications protocols include card initiated communication. For example, a logical full-duplex scheme may be devised for systems that do not have actual full-duplex.

Figure 8:
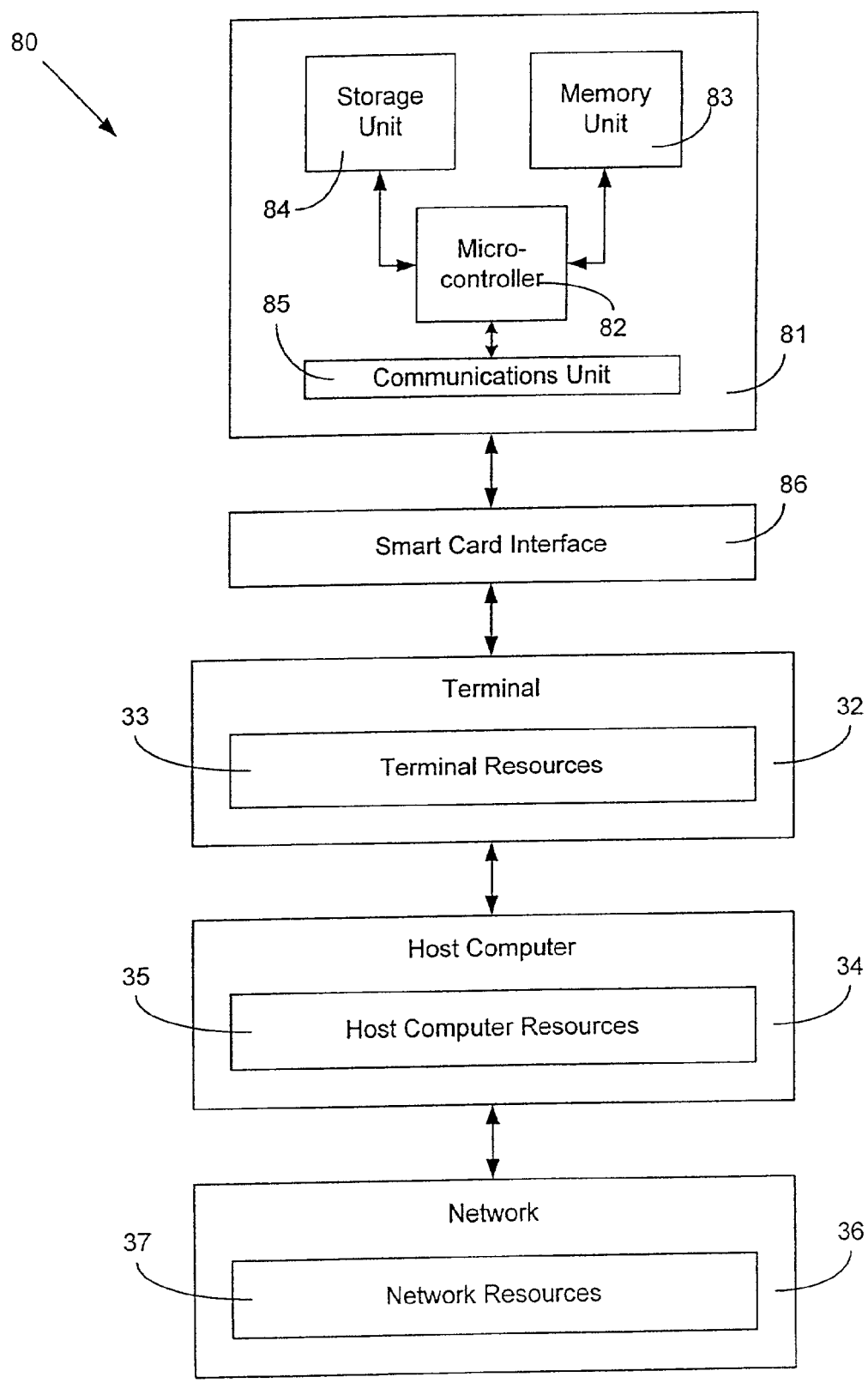
FIG. 8 is another embodiment of the smart card system.

Referring to FIG. 8, another embodiment of a smart card system 80 comprises a smart card 81 connected to a smart card terminal 32. The smart card 81 has an embedded microcontroller 82, memory unit 83, and storage unit 84, all of which are interconnected. The microcontroller 82 executes smart card software and programs, carries out terminal instructions, and generally manages the flow of data to and from the smart card 81. In some embodiments, the microcontroller 82 may include a microprocessor (e.g., a 68HC05), a programmable array logic (PAL), an application-specific integrated circuit (ASIC), and/or other integrated circuit devices. The memory unit 83, which may include a random-access-memory (RAM), temporarily stores software and data used by the microcontroller 82 during program execution. The storage unit 84, which may include a read-only memory (ROM), stores the basic program codes and data that are needed to configure and operate the smart card 31. New or updated codes and data may be downloaded or programmed into the smart card 81 from time to time to upgrade the smart card 81. The smart card 81 also has a communications unit 85 that is connected to the microcontroller 82 and allows the microcontroller 82 to transfer data to and from the terminal 32 and other external devices. Although shown as separate blocks, the microcontroller 82, memory unit 83, storage unit 84, and communications unit 85 may be combined into a single integrated circuit device or an otherwise reduced or expanded number of separate IC devices.

The smart card 81 is connected to the terminal 32 by a smart card interface 86 which facilitates communication between the smart card 81 and the terminal 32. The interface 86 typically includes a smart card reader or reader/writer and a power supply, such as a battery, (not shown) that provides power to the smart card 81. In some embodiments, the interface 86 physically engages the smart card 81. In other embodiments, however, the interface 86 may use inductive, capacitive, or optical coupling, or the interface 86 may use radio frequency signals to connect the smart card 81 to the terminal 32.

Figure 9:
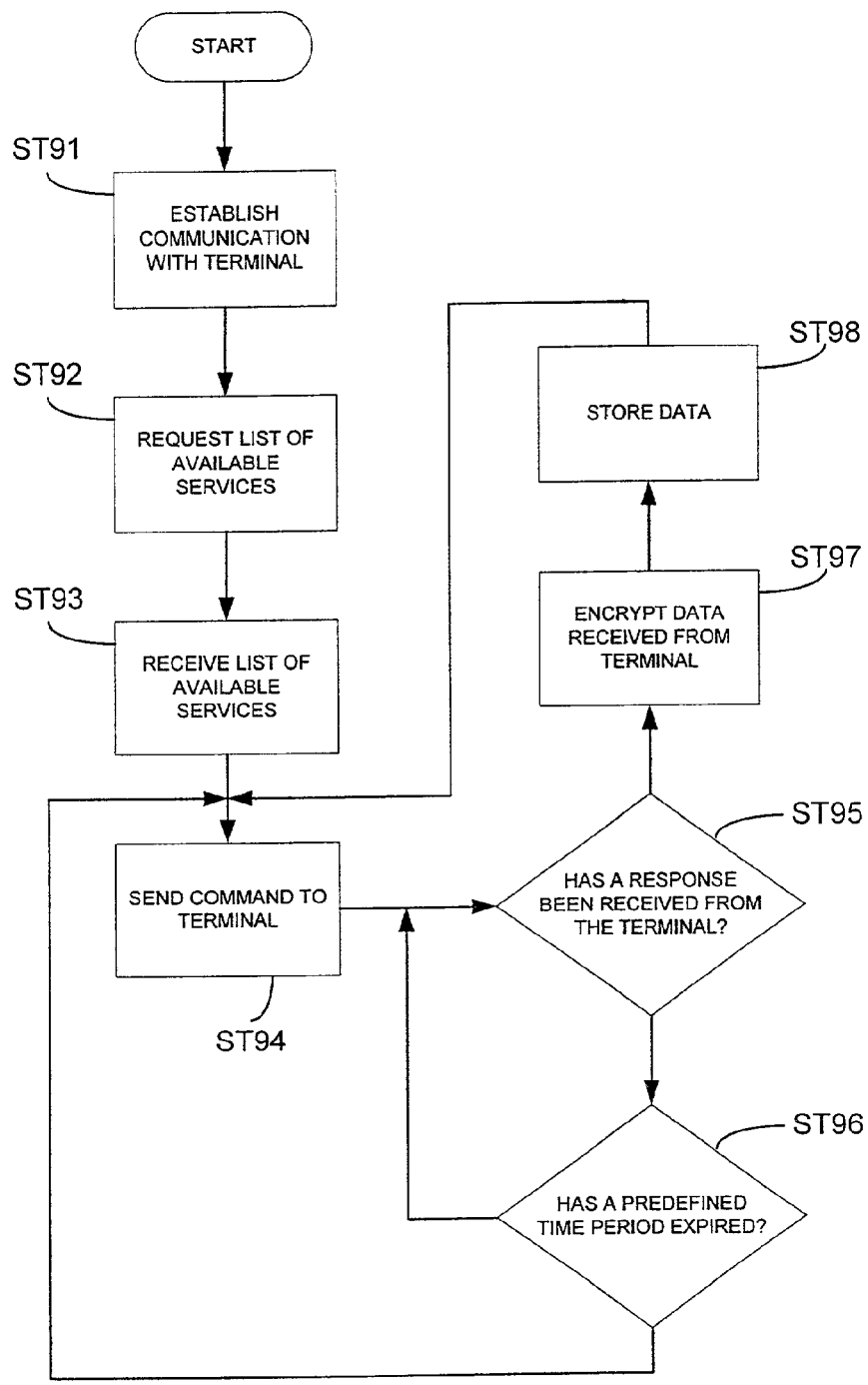
FIG. 9 is a method of operating a smart card.

In operation, the smart card 81 is able to access and control the terminal 32 and terminal resources 33 by initiating communication with the terminal 32 and terminal resources 33, contrary to conventional smart cards that only respond to received commands. Referring to FIG. 9, communication between the smart card 31 and the terminal 36 is established, for example, via an electronic handshake or series of handshakes (ST91). The smart card 81 than requests a list of available services from the terminal 32 (ST92). The list of services may vary depending on the type of terminal 32 (e.g., a video game, security system, etc.) and terminal resources 33. Once the list of available services or commands is received from the terminal 32 (ST93), the smart card 81 sends a command to the terminal 32 based on the services that are available (ST94). The smart card 81 then checks to see if a response to the command has been received from the terminal 32 (ST95). If a response has been received, the smart card 81 encrypts (ST97) and stores (ST98) any data received from the terminal 32, and prepares itself to send another command to the terminal 32 (ST94). If not, the smart card 81 checks to see if a predefined time period has expired or timed out (ST96). If the predefined time period has expired, then the smart card 81 re-transmits the command to the terminal 32 (ST94). If the predefined time period has not expired, the smart card 81 checks again to see if the response has been received from the terminal 32.

The smart cards described above facilitate a wide range of new and innovative smart card applications heretofore unrealizable with conventional smart card architectures. Three such applications are disclosed below.

Figure 10:
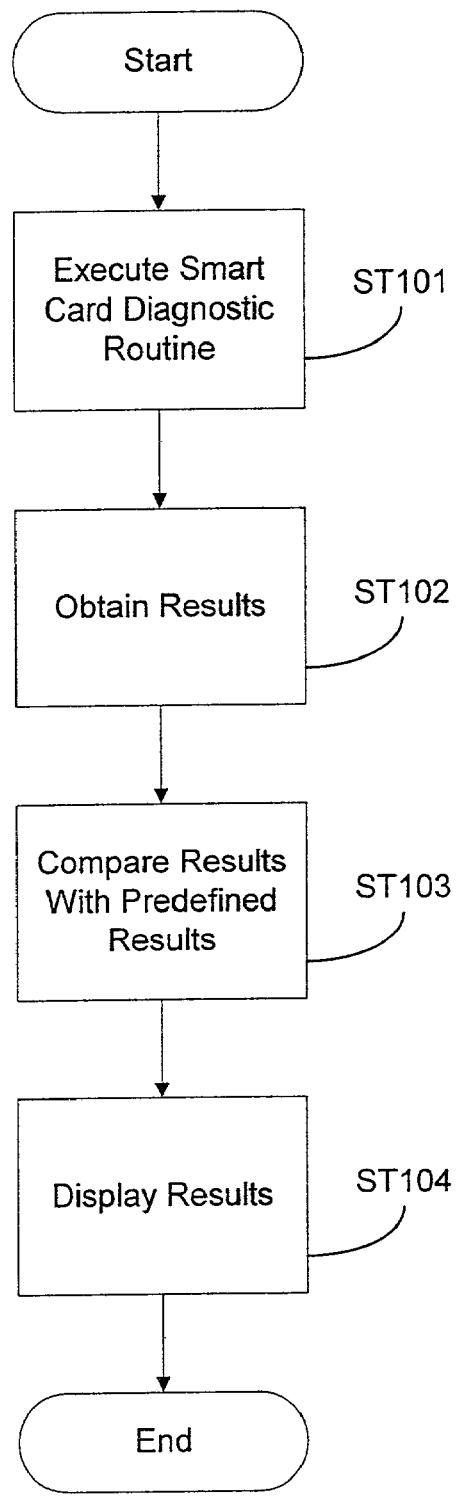
FIG. 10 is another method of operating a smart card.

Smart card programs are typically very difficult to develop and debug due to the lack of visibility into the cards necessitated by the strict security requirements of most smart card applications. The ability of the smart card to drive the terminal allows one having ordinary skill in the art to develop debugging applications that are resident on the card and program test harnesses to exercise difficult to reach sections of smart card code. Such applications can make use of a terminal display to provide internal state and runtime trace information to assist in debugging card resident applications. Referring to FIG. 10, one such application begins with executing a debugging routine (ST101), for example, a memory test routine. After running the routine, the smart card outputs a result (ST102), such as, e.g., the number of rows and columns in the memory unit that passed the test. The results are compared with a known or predefined number of good rows and columns (ST103) and the results are displayed on the terminal display (ST104). In some embodiments, the user may use a terminal input device to select different sections of the smart card's program to execute.

Network games traditionally have suffered from a lack of security, which allows devious players to manipulate stored data to enhance game attributes to the detriment of other players. This can result in general dissatisfaction with the game itself. The solution employed in some cases is to require all players to access a secure host computer which stores the gaming files; however, this slows down the host computer and limits the number of simultaneous players per game. With a smart card that is able to interact fully with the user and the network, a game may be stored and executed entirely on the smart card. Such a game benefits from the secure environment provided by the smart card and does not require a secure host. This removes the limit on the number of simultaneous players. Also, each player may interact directly with other players and be confident that the gaming information stored on the opponent's smart card is free from tampering.

Solitaire games which reward high scores also are subject to such tampering by devious players, which has discouraged the deployment of such games. However, with the game and data files, including the prize validation information, stored securely and executed in a smart card, these solitaire games can become more viable with dishonest play prevented and honest levels of achievement appropriately rewarded.

It is to be understood that the embodiments described above are merely illustrative and that other arrangements can be devised by one of ordinary skill in the art at the time the invention was made without departing from the scope of the invention.

APPENDIX A

```
/*
** Oki Dev Program - Written by Michael Montgomery Apr. 10, 1997
** Copyright © 1997 Schlumberger Austin Products Center,
** Schlumberger Technologies, Austin, Texas, USA.
** All Rights Reserved.
**
** This program was written to demonstrate the display request command
** to control the OKI display. This program monitors the keypad,
** and toggles the segment corresponding to the two keys entered.
** The first key enters the row number (byte to be changed), and
** the second key enters the column number (bit to be changed).
**
** Pressing the Cancel key, immediately followed by Unlock key,
** cancels autoexecution of this program.
**
** Any other keypress is ignored.
**
*/
public class OkiDev {
  public static void main(String args[ ]) {
    // Send back the answer to Reset (ATR)
    _OS.SendATR( );
    // Allocate command buffers
    byte[ ] keyscanbuffer = new byte[OkiDevConst.KEY_SCAN_CMD_LENGTH];
    byte[ ] keydatabuffer = new byte[OkiDevConst.KEY_DATA_CMD_LENGTH];
    byte[ ] dispmapbuffer = new byte[OkiDevConst.DISP_MAP_CMD_LENGTH];
    // Allocate receive buffers
      byte[ ] receiveddatabuffer = new byte[OkiDevConst.RECEIVED_DATA_LENGTH];
      // Build display command buffers
      dispmapbuffer[0] = OkiDevConst.ISO_ESCAPE;
      dispmapbuffer[1] = OkiDevConst.INS_LCD_DISPLAY;
      dispmapbuffer[2] = OkiDevConst.DISPLAY_SEGMENT_MAP;
      dispmapbuffer[3] = OkiDevConst.DISP_MAP_DATA_LENGTH;
      dispmapbuffer[4] = (byte)0xFF;
      dispmapbuffer[5] = (byte)0xFF;
      dispmapbuffer[6] = (byte)0xFF;
      dispmapbuffer[7] = (byte)0xFF;
      dispmapbuffer[8] = (byte)0xFF;
      dispmapbuffer[9] = (byte)0xFF;
      dispmapbuffer[10] = (byte)0xFF;
      dispmapbuffer[11] = (byte)0xFF;
      dispmapbuffer[12] = (byte)0xFF;
      dispmapbuffer[13] = (byte)0xFF;
      dispmapbuffer[14] = (byte)0xFF;
      dispmapbuffer[15] = (byte)0xFF;
```

What is claimed is:

1. A method of operating a smart card and smart card terminal to simulate asynchronous communication between the smart card and smart card terminal such that either the smart card or the smart card terminal may operate as master and the other operating as slave wherein the smart card and smart card terminal communicate in a half-duplex protocol, comprising:

sending a first message from the smart card terminal to the smart card, wherein if the smart card terminal has no data to send the smart card, the first message is a polling packet;

receiving the first message at the smart card;

upon receipt of the first message, if the smart card has data to send, sending a second message from the smart card to the terminal containing a length of data indication;

upon receipt of the second message from the smart card, sending a third message from the terminal to the smart card as an indication from the terminal to the smart card to commence sending the data; and sending a message containing the data from the smart card to the terminal.

2. The method of claim 1 wherein the indication from the terminal is a special packet having a length which is equal to the length indicated by the smart card.

3. The method of claim 1 further comprising marking each message with a unique sequence number correlating a sequence of messages.

4. The method of claim 3 further comprising the step of deferring response to a message while sending other messages from the smart card to the terminal.

5. The method of claim 4, when a response to a deferred message is ready, sending a response to the deferred message by marking the message with the sequence number of the deferred message.

6. A smart card comprising:

means configured to simulate the initiation of communications to a smart card terminal having:

means operable to receive a polling packet from the terminal on a synchronous communications channel; and means, in response to receiving a polling packet, operable to transmit an indication that the smart card desires to transmit data to the terminal over the synchronous communications channel;

means operable to use the means configured to simulate the initiation of communications to request resources selected from the set including terminal resources, host resources, and network resources.

7. The smart card of claim 6 wherein the indication that the smart card desires to transmit data contains an indication of the length of data the smart card desires to send to the terminal.

8. The smart card of claim 6 wherein the means configured to simulate the initiation of communication uses full duplex.

9. The smart card of claim 6 wherein the means configured to simulate the initiation of communication uses a standard packet protocol.

10. The smart card of claim 6 wherein the means configured simulate the initiation of communication uses a network packet protocol.

11. The smart card of claim 6 wherein the network resources are identified using domain name services.

12. The smart card of claim 6 wherein the network resources are accessed by remote message invocation.

13. The smart card of claim 6 wherein the network resources are accessed by remote procedure call.

14. The smart card of claim 6 wherein the network resources enable network games.

15. The smart card of claim 6 wherein the network resources enable remote diagnostics.

16. A computer system comprising:
   a terminal for communicating with smart cards over a synchronous communications channel;
   the terminal having means for simulating allowing the smart card to initiate communication with the terminal and means for transmitting, over the synchronous communications channel, a polling packet to the smart card requesting an indication of whether the smart card desires to transmit data to the terminal.

17. The computer system of claim 16 wherein the terminal further comprises means for receiving a data length indication from the smart card.

18. The computer system of claim 17 wherein the terminal further comprises means for transmitting to the smart card an indication to commence transmitting data having the length indicated by the smart card in the data length indication.

* * * * *